United States Patent [19]

Lopes

[11] Patent Number: 5,012,800
[45] Date of Patent: May 7, 1991

[54] MECHANICAL-METALLURGIC PROCESS FOR REPAIRING MACHINES OR MACHINE COMPONENTS DAMAGED BY CRACKS, FISSURES, WEARINGS OR SQUASHES MADE OF METALLIC MATERIAL DIFFICULT TO WELD AND OF ANY FORMS

[76] Inventor: José F. Lopes, Rua Padre José Achoteguin, 37, Sao Paulo-SP, Brazil

[21] Appl. No.: 434,923

[22] Filed: Nov. 9, 1989

[51] Int. Cl.$^5$ ............................................. B23K 31/02
[52] U.S. Cl. .................................................... 228/119
[58] Field of Search ......................................... 228/119

[56] References Cited

U.S. PATENT DOCUMENTS

| | | | |
|---|---|---|---|
| 4,467,955 | 8/1984 | Maupin, Jr. | 228/119 |
| 4,567,649 | 2/1986 | Ades et al. | 29/889.1 X |
| 4,611,744 | 9/1986 | Fraser | 228/119 |
| 4,613,744 | 9/1986 | Fraser | 228/119 X |

Primary Examiner—Kenneth J. Ramsey

[57] ABSTRACT

The present invention relates to an integrated restoration process in which material parts are repaired to provide a renewal part which is stress free. The invention includes cleaning, analyzing and sampling the surface of the element to be repaired and selecting the proper additional material.

1 Claim, No Drawings

MECHANICAL-METALLURGIC PROCESS FOR REPAIRING MACHINES OR MACHINE COMPONENTS DAMAGED BY CRACKS, FISSURES, WEARINGS OR SQUASHES MADE OF METALLIC MATERIAL DIFFICULT TO WELD AND OF ANY FORMS

BACKGROUND OF THE INVENTION

This invention refers to an integrated process for repairing by welding of machines or machine components made of metallic material of any chemical compositions and difficult to be welded, damaged by cracks or fissures because of fatigue or overload and squash or excessive wear using the correct combination of machanic, thermic and metallurgic actions, in order to eliminate or minimize internal stresses accumulated during the machine or component operational life, remove and repair the failure-crack, fissure, or squash—and guarantee a minimum residual stresses after repair, being the machine or component in an original technical condition, as far as strength and mechanical-metallurgic integrity are concerned.

Until this invention, the loss was complete in respect to the failure due to squash or excessive wearing in machines or components, made of metallic material difficult to be welded, because of high sensitivity to thermo-mechanic stresses and easy transformation into more energetic metallurgic phases susceptibility to the formation of cracks-inducted in a process of localized heating, when such elements are, also a characterized by complex forms and favourable to additional loads such as of the type of mechanic restriction or high variation in section modules. The whole machine or component had to be replaced. In such a situation, besides this total loss, the long and expensive time the machine remains stopped for repairs must be computed.

Up to now, the repair of elements which had problems in simple or more complex constructive situations covered by this patent followed the method of welding preceeded by pre-heating, based on the control of the temperature of the base metal, and a heat treatment for stress relief after the weld. In such conditions, the well-known procedures of heat weld have been adopted, in ovens as well as in determined sections or elements by means of electric resistances applied on the spot and covered by thermic insulating material, like a wrap. The rod to weld, or the deposit material, has been identified as being the more adequate for the base metal, taking into consideration the strength it must give to the base metal.

Besides the incidence of induced distortion in the repaired machine or machine component, it was also observed that the processes adopted up to now always accuse failures, mainly failures due to ruptures, in the repaired spot as well as in the rest, more commonly produced by effects of structural stresses induced by mechanisms of mechanic restriction, due to distortion or even residual stresses developed in elements of high variation of section modules, or inadequate deposit. These effects have greatly prejudiced such repairs.

SUMMARY OF THE INVENTION

The present invention relates to an integrated process for repair in which a rod or deposit material is selected or elaborated after a base material has been accurately analyzed.

DESCRIPTION OF THE PREFERRED EMBODIMENTS

In this invention, called integrated process to repair, the rod or deposit metal is selected or elaborated after the base metal is accurately analyzed, provided that the deposit metal is not a strange element. These analyses identify, in addition to the chemical composition and the metallurgic condition, the physical condition and the process to obtain said base metal.

Still according to the process of this patent, after the chemical and/or mechanical cleaning of the surface of the element to be repaired, all the existing difficulties appear clearly, besides the one already detected which characterized the failure, by means of non-destructive tests and sampling.

Once all the existing difficulties are identified, the squashed or smashed zones are superficially removed and the cracks and fissure are opened with chamfers produced by mechanic means or carbon. The remotion processes and the opening are executed without any residual stress at significant levels, and with the use of pre-heating and/or superficial mechanic remotion after the operations perfomed with heat.

Once the remotion and the opening to be repaired are performed and cleaned, points of reference are determined for the dimensional control during the welding process, in order to preserve the dimensional condition of the element. These points of reference are determined according to the characteristics of the biggest opening to be repaired and to the main axles of the element. The points of reference are created by the welding, in the element, of pins in the extremities of the reference measures.

Depending on the dimensions of the element and on the repairs to be performed, this element is hypothetically divided in zones with similar masses as symmetrically as possible. A center of mass is determined for each zone, as accurately as possible, where the applications of thermocouple will be made for the effective control over the temperature variations between the different zones. Some mass can be added to control the temperature between these zones, in order to minimize the thermic inertia between each zone.

Once the remotions, the opening to be repaired cavities, the reference points for the dimensional control and the zones of thermic control are defined, processed and cleaned, the final position of the element is defined, for the welding. The ideal support is isostatic, but the hyperstatic one can also be used.

Then, the normal electric resistance are distributed on the surfaces to be heated, to prepare the process of welding, the zones being insulated by pieces of technical ceramic, with quick clamp terminals in the extremities for coupling with cables of high amperage. The amount of electric resistance to be applied on the surface of each zone depends on its thermic inertia.

After the application of the electric resistances, the element is thermically insulated in 25 mm layers of ceramic fiber wraps, for an ideal insulating of 10 C.°/mm for a typical temperature of stress relief. Once the element is insulated, leaving open windows when there are opening to be repaired, it is belted in order to fix the insulating system. The pins for the points of reference must show up in the insulating layer.

The next step is to heat the element up to a temperature of 300 C°. The maximum heating rate in all zones must be 150 C.°/h.

Before starting the welding operation, it is necessary to make a heat treatment to relief the stresses the element acquired during its operational lifetime, making sure it is free from prewelding stresses and assuring it has the original properties of strength, resiliency and continuity. The thermic welding level must be the highest possible one, merely conditioned to the hardness the base metal must keep, depending on its physicmetallurgic structure. This level is, at least, the minimum temperature of stress relief for said base metal.

During the welding operation, the dimensional state of the element is controlled by means of reference pins, monitored by micrometric screws, comparative gauge or similars, and with the thermic control of the zones by compatible thermocouples and pyrometric system.

All the welding operations follow this sequence: opening of the insulating through the corresponding window, welding, cleaning, closing of the window, thermic equilibrium and dimensional conference. This procedure is repeated as many times as necessary until the welding is performed within the specified dimensions.

Once the welding is finished, the temperature level must be maintained long enough in order to relieve the welding stresses.

The cooling rate of each zone at the end of the relief phase is controlled, its cooling speed being the result of its thermic inertia.

When the element is cooled and attains the temperature of 80 C.°, a series of non-destructive tests are performed on the repaired zones. With the element at a metrological environmental temperature, its dimensions are confirmed, and the programme of machining "in loco" or with machines is established, for the zones with additional over-metal.

The process dealt with in this patent allows excellent results of machining "in loco" as well as with machines, and is characterized as being quick, efficient and of low cost when compared to the replacement of the element.

With this process, the element is restored with the same characteristics it had when new.

I claim:

1. A mechanical-metallurgic process for repairing machine components damaged by cracks, fissures, wearings or dents, made of metallic material, the steps comprising:

initially cleaning chemically or mechanically a surface of a component to be repaired revealing all existing difficulties;

non-destructive testing and sampling defining difficulties and analyzing characteristics of the components base material;

selecting a welding rod or addition material that is appropriate to the base material;

superficially removing surface damage zones, and providing cracks or fissures with chamfers produced mechanically or by carbon are defining reference points for a dimensional control during a welding process, for dimensionally monitoring said component, said reference points are determined according to characteristics of a biggest opening to be repaired and main axles of the component, said reference points being created by welding, in the component, of pins in extremities of reference measures;

hypothetically dividing the component into zones with similar masses, as symmetrically as possible, wherein for each zone, a center of mass is determined as accurately as possible;

applying thermocouples in the center of each zone for effective control of temperature variation during the whole process;

final isostatic positioning of the element preferentially, or, as a second option, hyperstestic positioning of wherein the element;

applying normal electric resistance for heating for the welding process on zones to be heated, wherein the resistance amount is distributed on the surface of each zone depending on its thermic inertia, the electric resistance being insulated with pieces of ceramic;

applying thermic insulating covering the area of repair difficulties, belting the insulation for fixation, the pins for the reference points being long enough to show up in the insulating layer;

applying heat up to a temperature of 300 C.°, wherein the heating rate in all the zone does not exceed 150 C.°/h;

applying heat treatment for stress relief thereby eliminating or minimizing pre-welding stresses;

applying welding through said windows to an area to be repaired;

dimensionally controlling the component by said reference pins, monitored by a system of micrometric screws, or comparative gauges, and the thermically controlling the zones by compatible thermocouples and pyrometric systems, wherein when the component is highly complex, with many points for a dimensional and/or thermic control, a computerized control system is used;

said welding being in the following sequence: opening of the insulation by a corresponding window, welding, cleaning, closing of the window, thermic equilibrium and dimensional conference, repeating this procedure as many times as necessary until the welding is performed within the specified dimensions;

after the welding is finished, maintaining the temperature level long enough to relieve the welding stresses, and cooling at a controlled rate to a temperature of 80 C.°; and at an environmental temperature, performing dimensional tests and non-destructive tests, and repeating the above process if necessary.

* * * * *

UNITED STATES PATENT AND TRADEMARK OFFICE
CERTIFICATE OF CORRECTION

PATENT NO. : 5,012,800
DATED : May 7, 1991
INVENTOR(S) : José F. Lopes

It is certified that error appears in the above-identified patent and that said Letters Patent is hereby corrected as shown below: On the title page:

[54] MECHANIC-METALLURGIC PROCESS TO REPAIR MACHINES OR MACHINE COMPONENTS DAMAGED BY CRACKS, FISSURES, WEARINGS OR SQUASHES MADE OF METALIC MATERIAL DIFFICULT TO BE WELDED AND OF ANY FORMS

[30] Foreign Application Priority Data
Jan. 11, 1989 [BR] Brazil ........... 8900172

Signed and Sealed this

Sixth Day of April, 1993

*Attest:*

STEPHEN G. KUNIN

*Attesting Officer*    *Acting Commissioner of Patents and Trademarks*